United States Patent [19]
Burroughs

[11] Patent Number: 5,133,124
[45] Date of Patent: Jul. 28, 1992

[54] METHOD FOR COMPACTING RECYCLABLE PLASTIC CONTAINERS

[76] Inventor: William G. Burroughs, 1208 Clearfield Cir., Lutherville, Md. 21093

[21] Appl. No.: 596,855

[22] Filed: Oct. 12, 1990

[51] Int. Cl.$^5$ ............................................. B29B 17/00
[52] U.S. Cl. ...................................... 29/403.1; 29/450; 29/521; 156/94; 264/37; 264/152; 264/156
[58] Field of Search ................... 264/37, 152, 154–156; 29/403.1, 432, 432.2, 450, 454, 505, 521; 156/94, 198

[56] References Cited

U.S. PATENT DOCUMENTS

| | | | |
|---|---|---|---|
| 1,076,897 | 10/1913 | Lettre | 229/125.39 |
| 1,448,362 | 3/1921 | Lanzit | 229/125.39 |
| 2,120,470 | 6/1938 | Patterson | 29/521 |
| 2,589,028 | 3/1952 | Poupitch | 24/221 |
| 2,901,816 | 9/1959 | Smith et al. | 29/505 |
| 3,465,414 | 9/1969 | Koett | 29/432.2 |
| 3,597,812 | 8/1971 | Allan | 24/249 |
| 3,640,556 | 2/1972 | Bennett | 29/432 |
| 3,846,218 | 11/1974 | Wootten | 264/156 |
| 3,858,752 | 1/1975 | Marvin, Jr. et al. | 220/325 |
| 3,925,875 | 12/1975 | Doke | 29/521 |
| 4,033,804 | 7/1977 | Baldyga | 264/37 |
| 4,184,396 | 1/1980 | Hafner | 29/432.1 |
| 4,391,037 | 7/1983 | Giasini | 29/432 |
| 4,517,711 | 5/1985 | Tanaka | 24/453 |
| 4,599,131 | 7/1986 | Matuszak | 156/584 |
| 4,801,232 | 1/1989 | Hempel | 411/552 |
| 4,986,691 | 1/1991 | Hafner | 29/521 |

FOREIGN PATENT DOCUMENTS 1409381  7/1988  U.S.S.R. .............................. 29/505

Primary Examiner—David A. Simmons
Assistant Examiner—William J. Matney, Jr.
Attorney, Agent, or Firm—Leonard Bloom

[57] ABSTRACT

A method for permanently compacting a hollow resilient structure such as a recyclable plastic container to facilitate recycling thereof. As the structure is compressed cutting blades provided on the compressing surface perforate the walls of the container thereby cutting interlocking tabs into the surface. At the same time the interlocking tabs are forced outward and through the cavity left in the walls of the container by displacement of the tabs. The tabs straddle the cavity and become locked against the walls of the container by the separating force of the resilient plastic.

32 Claims, 2 Drawing Sheets

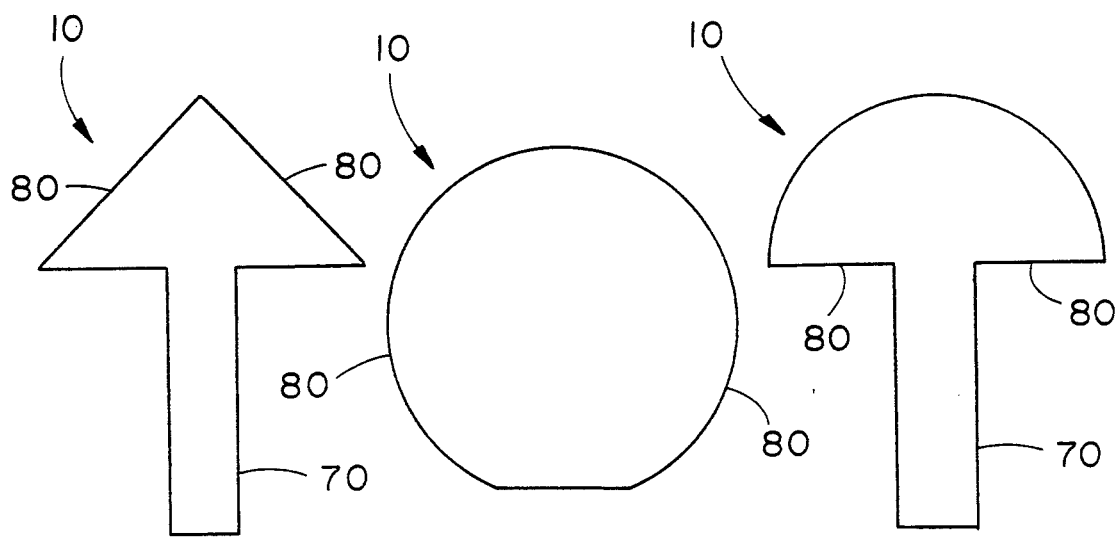
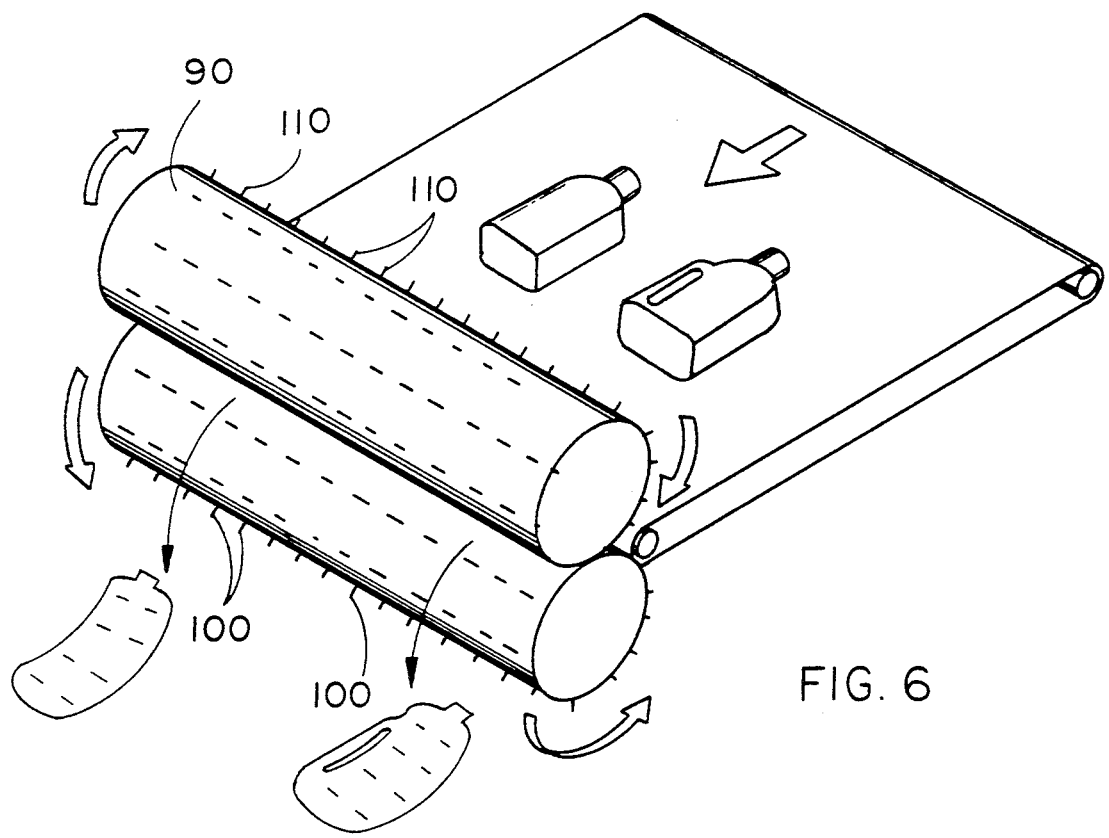

METHOD FOR COMPACTING RECYCLABLE PLASTIC CONTAINERS

BACKGROUND OF THE INVENTION

1. Field of the Invention

The present invention relates to a method and apparatus for compacting plastic containers and other resilient structures, and more particularly to a means for compressing the walls of plastic containers and for embossing interlocking plastic tabs in adjoining walls so that the container remains compressed despite a tendency to regain its original shape.

2. Description of the Background

The importance of recycling has moved to the forefront of public awareness, and a great demand has arisen for new and improved methods and devices for recycling waste. Plastic is a significant waste product, making up about eighteen percent (18%) (by volume) of the solid waste stream. The per-unit value of plastic is high enough to warrant a considerable effort at separating plastic containers from the waste stream and recycling them. However, the amount of recyclable plastic per unit of waste is relatively low, owing to the large volume that hollow plastic containers normally occupy. The economics of recycling plastic containers suffers as a result because enormous amounts of storage and transportation space is required for relatively little plastic. Thus, the yield of recycled plastic often fails to justify the inventory and transportation costs. Conventional methods exist for reducing the volume of such plastic containers. For instance, containers may be delivered to reprocessing plants which chip or shread the containers prior to recycling. Alternatively, machinery is available to compact and bail the plastic containers for more efficient storage and transportation. These high volume means for densifying plastic containers successfully reduce the volume of the plastic containers by 12 to 15 times. However, such machinery is extremely expensive and can only be justified at a high volume recycling center. Consumer and other low cost densifiers have been made available for low volume use, but these typically only reduce the volume of plastic containers by about 2 to 3 times. This is because each molded plastic container retains a "memory" of its previous shape and the resiliency of the plastic causes the container to expand to its original shape after having been compressed. The low volume compactors only superficially compress plastic containers, and the economics of recycling is not significantly improved. It would be greatly advantageous to find an inexpensive means for permanently compressing such plastic containers so that they retain a maximum density during shipping and transportation.

Other well-known means currently exist for improving the rigidity of containers in general. Notably, U.S. Pat. No. 1,076,897 discloses a fastener adopted to rigidly secure the flaps of a box in order to prevent the flaps from unfolding. The disclosed box fastener is in the general shape of a triangle mounted on a short stem. The triangle can be wedged between the flaps of the box until the flaps clear the triangle section and become locked against the stem. The disclosed box fastener is metallic and can be bent to conform to the top of the box. This and similar teachings can be expanded for the development of an improved compactor for plastic containers which suppresses the resilient memory of the plastic containers such that they retain their shape when compacted.

SUMMARY OF THE INVENTION

It is, therefore, an object of the present invention to provide a method and apparatus for simultaneously compressing plastic containers and the like and for cutting interlocking tabs into the walls of the containers so that the walls become locked together when they are compressed and the container retains its compressed shape despite a tendency to regain its original shape.

It is another object of the invention to provide an inexpensive and convenient apparatus for achieving the above described permanent compaction.

It is another object of the invention to use the resilient force of the plastic container to assist in the operation of the interlocking tabs.

It is yet another object of the present invention to provide tabs of various shapes and sizes to allow a choice in cutting blades and tab strength.

It is yet another object of the present invention to incorporate the above described recycling method and apparatus in a continuous roller-type compactor or a flat-plate compactor.

According to the present invention, the above-described and other objects are accomplished by providing a method and apparatus for securely compacting a hollow resilient structure such as a plastic container, and for anchoring a wall of the structure to another wall such that the structure remains compacted despite a tendency to regain an original shape, said method comprising the steps of compressing a first wall of a resilient container against a second wall, piercing the compressed walls of said structure in such a way that a first tab is cut into the first wall and a second underlying tab is cut into the second wall, the first tab being pressed through a perforation left in said second wall at said second tab, whereby when the walls of the container are released the first tab will remain anchored within the perforated second wall such that the container remains compacted despite a tendency to regain its original shape.

BRIEF DESCRIPTION OF THE DRAWINGS

Other objects, features and advantages of the present invention will become more apparent from the following detailed description of the preferred embodiments and certain modifications thereof when taken together with the accompanying drawings, in which:

FIG. 3 illustrates a differently shaped tab according to another embodiment of the present invention.

FIG. 4 illustrates a differently shaped tab according to a third embodiment of the present invention.

FIG. 5 illustrates a differently shaped tab according to a fourth embodiment of the present invention.

FIG. 6 is a perspective view of an apparatus for carrying out the compressing and cutting of tabs as shown in FIGS. 1-5.

DETAILED DESCRIPTION OF THE PREFERRED EMBODIMENTS

Figure 1:
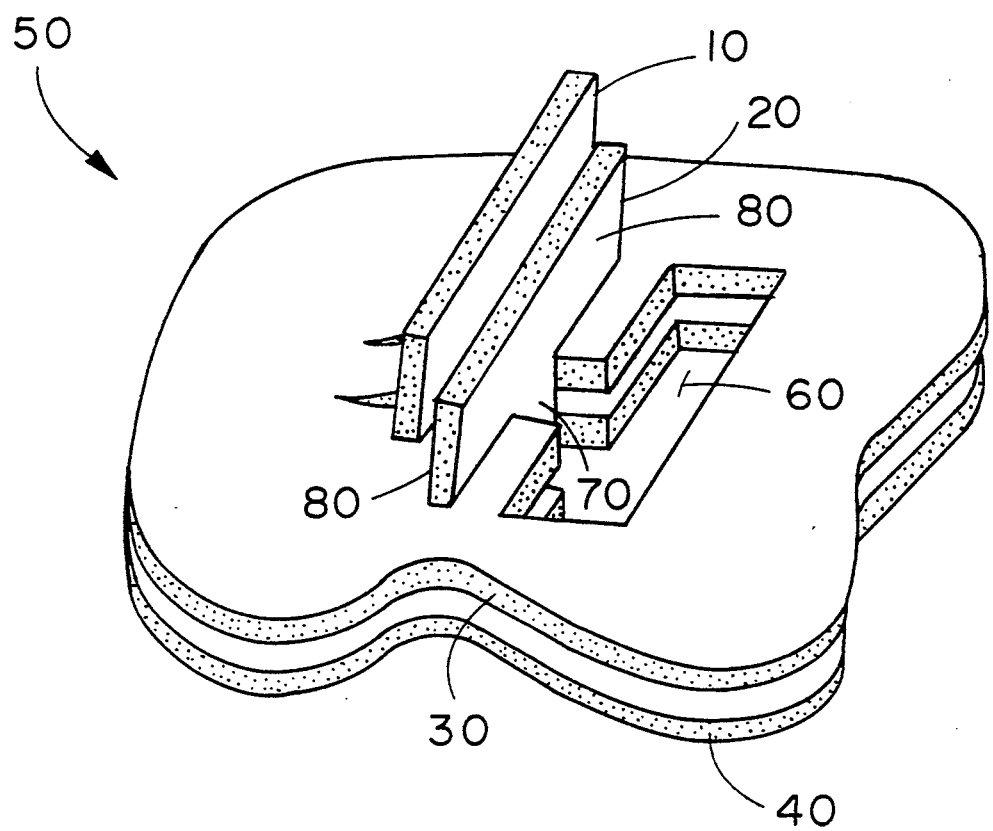
FIG. 1 is a perspective view of two tabs cut into abutting walls of a compressed plastic container according to one embodiment of the present invention.

FIG. 1 illustrates interlocking tabs 10 and 20 cut into abutting walls 30 and 40 of a compressed plastic container 50. First, the walls 30 and 40 of container 50 are compressed together by conventional means such as a roller-type compactor or a flat plate-type compactor. At the same time that the walls are compressed, cutting blades extending from the compactor cut uniform tabs 10 and 20 through the abutting walls 30 and 40 of container 50. Both tabs 10 and 20 are formed having a smaller stem section 70 which remains connected to the walls 30 and 40, and laterally extending ears 80 which are not connected to the walls 30 and 40 except via stem 70. It should be noted that multiple walls can be compressed together and that more than 2 superposed tabs may be cut through that multiple abutting walls. As the cutting blades mounted on the compactor cut the tabs 10 and 20 through walls 30 and 40, the tabs are displaced and are pushed outward leaving a pocket section 60. Tab 20 is pushed through the pocket section 60 left by displacement of the overlying tab 10. As tabs 10 and 20 are displaced during the cutting operation the "memory" of the plastic container creates a separating force between walls 30 and 40. This force causes tab 20 to slide as far into pocket 60 as possible. Tab 20 will slide into the cavity left by displacement of the stem 70, and the ears 80 will straddle walls 30 and 40 on both sides of the stem portion of pocket 60. Thus, tab 20 becomes interlocked in wall 30 and will oppose the separating force caused by the resiliency of the container.

For a strong interlocking connection a number of factors must be considered. First of all, a number of different tabs shapes are possible, each having a different strength. In addition, the width, height and shape of tab 10 and 20 must be carefully chosen to prevent collapsing of the tab ears 80 or tearing at stem portion 70. In the basic design shown at FIG. 1 the lower periphery of tab ears 10 and 20 must be larger than the section of the pocket 60 which they fit into. This is accomplished with the T design illustrated in FIG. 1. The T design comprises a rectangular section defined by laterally extending ears 80 mounted on a stem section 70. The ears 80 of tabs 10 and 20 become locked against walls 30 and 40 on both sides of the narrow stem section of pocket 60. The dimensions of ears 80 and of stem 70 must be carefully chosen to prevent folding or tearing in response to the separating force of the walls. In addition, the overall height of the tab and stem length of the tab must be carefully chosen. The height of tabs 10 and 20 limits the degree of compaction which may be obtained by use of the disclosed method and apparatus. Improved compacting results can be achieved if the height of tabs 10 and 20 is minimized. The length of stem 70 contributes to the overall tab height and should also be minimized in order to provide maximum densification. However, the length of stem 70 is also determinative of the number of walls which can be interlocked together. For example, if stem 70 is relatively long multiple superposed tabs can be cut into multiple abutting walls and all of these tabs can be pushed through pocket section 60 and will fit within stem section of pocket 60. Therefore, all of the tabs will provide a locking force to oppose the tendency of the walls to separate. The overall height of the tab and the stem length also effect the strength of the tab and must be viewed in light of the width, height and shape of the tab in order to choose dimensions which will yield the proper combination of strength and density of compaction. Likewise, the dimensions of tabs 10 and 20 determine the dimension of pocket section 60 which in turn determines the strength of the pocket 60. A longer stem section 70 will decrease the strength of the pocket 60 and will increase the tendency of the tab ears 80 to pull through the pocket 60. Care must be taken to avoid this problem.

Figure 2:
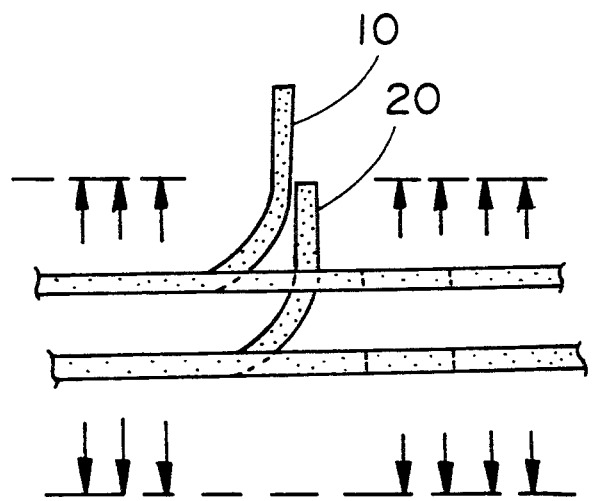
FIG. 2 is a side view of the interlocking tabs of FIG. 1.

In order to provide the appropriate combination of the above described features for a given application a number of different sizes and shapes are described in addition to the basic tab 10 shown in FIGS. 1 and 2.

FIG. 3 illustrates a tab 10 defined by a substantially triangular section mounted on stem 70. This tab 10 is defined by ears 80 which are the base angles of the triangle.

FIG. 4 depicts a circular tab 10 with sides forming ears 80.

FIG. 5 depicts a tab 10 having a truncated circular portion mounted on stem 70.

These and similarly shaped tabs may be used for compacting recyclable containers in accordance with the present invention. The specific dimensions of these tabs may be varied to achieve the desired combination of strength, multiple locking potential and densification ability.

FIG. 6 illustrates one embodiment of a compacting apparatus according to the present invention. The apparatus shown in FIG. 6 incorporates abutting rollers 90 and 100 which rotate in opposite directions. The surface of both rollers is provided with multiple cutting blades 110 for cutting the appropriate tabs into the walls of the recyclable container as the container is being compressed between roller 90 and 100. Other embodiments are also possible, such as flat compression plates (not shown) with opposing surfaces equipped with cutting blades 110. The opposing surfaces may be forced together to obtain the desired result. Both of the above described devices may be driven manually, or may be self driven by a motor or pneumatic system.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A method for securely compacting a hollow resilient structure and for anchoring a wall of said structure to another wall such that said structure remains compacted despite a tendency to regain an original shape, said method comprising the steps of:
   compressing a first wall of said structure against a second wall of said structure;
   piercing the compressed walls of said structure in such a way that a first tab is cut into said first wall and a second underlying tab is cut into said second wall, and said first tab is pressed through a perforation left in said second wall at said second tab;
   whereby when said walls of said structure are released said first tab will remain anchored within the perforated second wall such that said structure remains compacted despite a tendency to regain its original shape.

2. The method according to claim 1, wherein said piercing step creates substantially uniform first and second tabs having an unconnected upper portion, and narrower lower portions connected to a corresponding one of said first and second walls, said tabs being substantially identical to one another.

3. The method according to claim 2, wherein said piercing step creates tabs defined by a truncated circular shape.

4. The method according to claim 2, wherein said piercing step creates tabs defined by a triangular shape.

5. The method according to claim 2, wherein said piercing step creates a lower portion of said tabs defined by an elongate stem connected to and extending from corresponding ones of said walls.

6. The method according to claim 5, wherein said piercing step creates tabs defined by a truncated circular portion at an extended end of said stem.

7. The method according to claim 5, wherein said piercing step creates tabs defined by a triangular portion at an extended end of said stem.

8. The method according to claim 5, wherein said piercing step creates an upper portion of said tabs defined by ears extending laterally from said stem.

9. The method according to claim 8, wherein said piercing step creates an upper portion of said tabs defined by a rectangle.

10. The method according to claim 1, wherein said container is plastic.

11. A method for securely compacting a hollow resilient structure and facilitating the recycling thereof by anchoring a wall of said structure to another wall such that said structure remains compacted despite a tendency to regain an original shape, said method comprising the steps of:
compressing a first wall of said structure against a second wall of said structure;
incising the compressed walls of said structure to form a first tab in said first wall overlying a second tab in said second wall;
penetrating said compressed walls at said tabs to force said first tab through a perforation left in said second wall at said second tab;
releasing said walls of said structure such that said first tab remains anchored within the perforated second wall and said structure remains compacted despite a tendency to regain its original shape.

12. The method according to claim 11, wherein said incising step creates substantially uniform first and second tabs having an unconnected upper portion, and a narrower lower portion connected to corresponding ones of said first and second walls, said tabs being substantially identical to one another.

13. The method according to claim 12, wherein said incising step creates tabs defined by a truncated circular shape.

14. The method according to claim 12, wherein said incising step creates tabs defined by a triangular shape.

15. The method according to claim 12, wherein said incising step creates a lower portion of said tabs defined by an elongate stem connected to and extending from corresponding ones of said walls.

16. The method according to claim 15, wherein said incising step creates tabs defined by a truncated circular portion at an extended end of said stem.

17. The method according to claim 15, wherein said incising step creates tabs defined by a triangular portion at an extended end of said stem.

18. The method according to claim 15, wherein said incising step creates an upper portion of said tabs defined by ears extending laterally from said stem.

19. The method according to claim 18, wherein said incising step creates an upper portion of said tabs defined by a rectangle.

20. The method according to claim 12, wherein said container is plastic.

21. A method for securely compacting a hollow resilient container and for anchoring a plurality of walls of said container together such that said container remains compacted despite a tendency to regain an original shape, said method comprising the steps of:
compressing a plurality of walls of said container together;
piercing the compressed walls of said structure, cutting a corresponding plurality of tabs in each wall such that the tabs are superposed and said plurality of tabs are pressed through a perforation formed through said walls by displacement of said tabs;
whereby when said walls of said structure are released said plurality of tabs remain anchored within the perforation such that said structure remains compacted despite a tendency to regain its original shape.

22. The method according to claim 21, wherein said piercing step creates tabs having a stem of sufficient length so that when said stem is displaced a perforation is left which is capable of anchoring multiple tabs.

23. A method for securely compacting a hollow resilient structure and facilitating the recycling thereof by anchoring a wall of said structure to another wall such that said structure remains compacted despite a tendency to regain an original shape, said method comprising the steps of:
compressing a first wall of said structure against a second wall of said structure;
incising the compressed walls, of said structure to form a first tab in said first wall overlying a second tab in said second wall and to form a third tab in said second wall overlying a fourth tab in said first wall;
penetrating said compressed walls at said tabs to force said first tab through a perforation let in said second wall at said second tab and to force said third tab through a perforation left in said first wall at said fourth tab, wherein said third and fourth tabs ar oriented oppositely to said first and second tabs, releasing said walls of said structure such that said first tab remains anchored within the perforated second wall, said third tab remains anchored within the perforated first wall and said structure remains compacted despite a tendency to regain its original shape.

24. The method according to claim 23, wherein said incising step crates substantially uniform first and second tabs having an unconnected upper portion, an a narrower lower portion connected to corresponding ones of said first and second walls, said fist and second tabs being substantially identical to one another, and further creates substantially uniform third and fourth tabs having an unconnected upper portion and a narrower lower portion connected to corresponding ones of said second and first walls, said third and fourth tabs being substantially identical to one another.

25. The method according to claim 24, wherein said incising step creates tabs defined by a truncated circular shape.

26. The method according to claim 24, wherein said incising step creates tbs defined by a triangular shape.

27. The method according to claim 24, wherein said incising step creates a lower portion of said tabs defined by an elongate stem connected to an extending from corresponding ones of said walls.

28. The method according to claim 27, wherein said incising step creates tabs defined by a truncated circular portion at an extended end of said stem.

29. The method according to claim 27, wherein said incising step creates tabs defined by a triangular portion at an extended end of said stem.

30. The method according to claim 27, wherein said incising step creates an upper portion of said tabs defined by ears extending laterally from said stem.

31. The method according to claim 30, wherein said incising step creates an upper portion of said tabs defined by a rectangle.

32. The method according to claim 23, wherein said container is plastic.

* * * * *